US012749260B1

(12) United States Patent
Morales Hernando et al.

(10) Patent No.: US 12,749,260 B1
(45) Date of Patent: Sep. 29, 2026

(54) LIGHT WRAPPING EFFECTS FOR AVATARS

(71) Applicant: Apple Inc., Cupertino, CA (US)

(72) Inventors: Borja Morales Hernando, Sunnyvale, CA (US); Ivan Gavrenkov, San Jose, CA (US); Long H. Ngo, San Jose, CA (US); Michael S. Hutchinson, San Carlos, CA (US); Yutaka Yokokawa, Los Gatos, CA (US); Edward F. Yang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 108 days.

(21) Appl. No.: 18/679,694

(22) Filed: May 31, 2024

Related U.S. Application Data

(60) Provisional application No. 63/505,907, filed on Jun. 2, 2023.

(51) Int. Cl.
*G06T 15/50* (2011.01)
*G06T 15/04* (2011.01)
*G06T 15/30* (2011.01)

(52) U.S. Cl.
CPC ............ *G06T 15/503* (2013.01); *G06T 15/04* (2013.01); *G06T 15/30* (2013.01)

(58) Field of Classification Search
CPC ........ G06T 15/503; G06T 15/04; G06T 15/30
See application file for complete search history.

(56) References Cited

U.S. PATENT DOCUMENTS

| | | | | |
|---|---|---|---|---|
| 11,423,616 | B1 * | 8/2022 | Simon Kreuz | G06N 3/09 |
| 2003/0001837 | A1 * | 1/2003 | Baumberg | G06T 15/20 345/419 |
| 2013/0243255 | A1 * | 9/2013 | Williams | A63F 13/428 382/103 |
| 2020/0043219 | A1 * | 2/2020 | Hunt | G06T 19/006 |

* cited by examiner

*Primary Examiner* — Tammy Paige Goddard
(74) *Attorney, Agent, or Firm* — Blank Rome LLP

(57) ABSTRACT

Applying a blurred, light wrapping effect to an avatar in an efficient manner includes rendering a blur pass comprising a first texture comprising a first avatar representation of a first subject on which a blur treatment is applied. In a target resolution pass, a second texture is rendered comprising a second avatar representation, wherein the second avatar representation of the first subject is associated with one or more confidence values based on sensor data from which the second avatar representation is generated. A composite image is generated using the blur pass and the second avatar representation, wherein a level of opacity of the second avatar representation is determined based on the one or more confidence values.

20 Claims, 9 Drawing Sheets

LIGHT WRAPPING EFFECTS FOR AVATARS

FIELD OF THE INVENTION

This disclosure relates generally to image processing. More particularly, but not by way of limitation, this disclosure relates to techniques and systems for providing efficient blur and light wrapping effects on avatars.

BACKGROUND

Extended reality environments allow users to interact with virtual objects and applications within a view of a physical environment. Often, users are represented in extended reality environments in the form of avatars. These avatars may provide a visual representation of the user, and may mimic the user's movements. The avatar may represent a current view of the user. However, the avatar may not represent the user well where camera data or other sensor data of the user is unavailable or not sufficient. Thus, improvements for avatar representations are needed.

DETAILED DESCRIPTION

Figure 1:
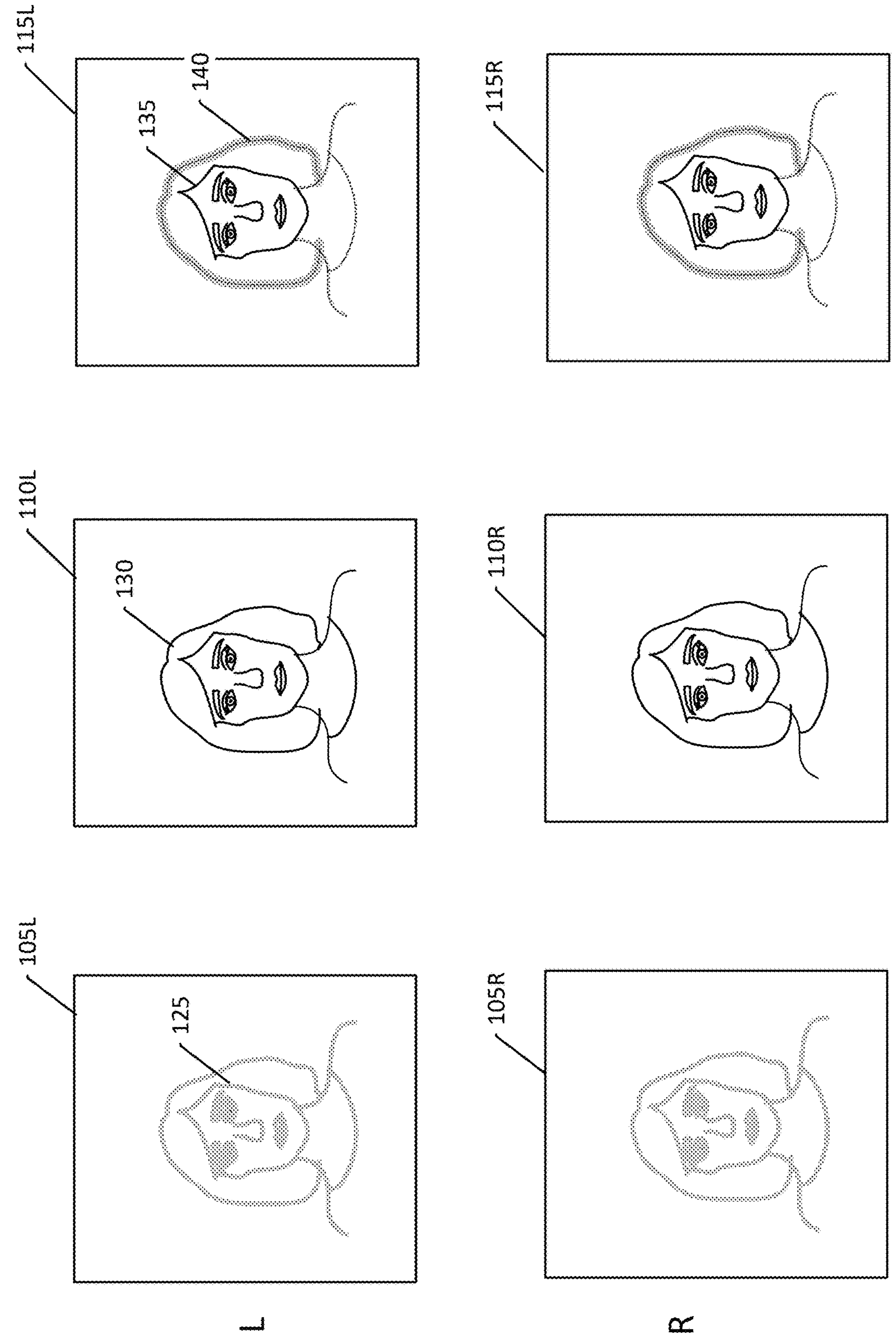
FIG. 1 shows a diagram for rendering an avatar with blur and light wrapping effects, according to one or more embodiments.

Embodiments described herein relate to a technique for rendering avatars. In particular, embodiments described herein described technique for rendering avatar representations of users with visual treatments applied in accordance with missing and/or low confidence data.

Techniques described herein relate to a method, system, and computer readable medium for using multipass rendering to generate avatar representations with visual treatments to improve presentation to account for missing or low confidence data. In general, a multipass rendering technique is described, including a blur pass where a blur plane is rendered comprising a blurred and/or lower resolution version of the avatar having visual treatments applied. In a texture pass, the full avatar texture is rendered with color and depth is rendered. Confidence values are applied to different portions of the avatar data. In a composite pass, an opacity of the different regions of the full avatar texture are modified in accordance with the confidence values, thereby causing portions of the blur plane to become visible through the target resolution texture.

In some embodiments, the blur pass may include a blur plane for the avatar. In the situation in which multiple avatars are present, each avatar may be associated with a different blur plane within a same blur texture. In this manner, the blur and/or other visual treatments can be applied within the blur planes without expending resources performing visual treatments outside the blur planes. In some embodiments, the blur planes for the multiple avatars may be rendered as different blur textures. When the blur planes are rendered as different blur textures, each blur plane can have different visual treatments applied.

The confidence values may be based on areas of the avatar for which limited data is available. For example, the confidence values may be determined based on sensor data from which the avatar data is generated. In some embodiments, when the avatar data is generated, the system may provide a confidence value which indicates a relative likelihood that the avatar data captured by the system provides an accurate photorealistic representation of the associated portion of the user or subject of the avatar. For example, the multipass rendering technique may include a geometry pass in which a geometry of the user is rendered. The geometry may be associated with confidence values indicative of a likelihood that the avatar data associated with the confidence values provide an accurate photorealistic representation of the user. In some embodiments, the confidence values may be derived from the geometry pass. Additionally, or alternatively, some predefined areas, such as hair, shoulders, or the like, can be identified as areas in which the blur plane should shine through. These areas may include the edges of the avatar.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation may be described. Further, as part of this description, some of this disclosure's drawings may be provided in the form of flowcharts. The boxes in any particular flowchart may be presented in a particular order. It should be understood, however, that the particular sequence of any given flowchart is used only to exemplify one embodiment. In other embodiments, any of the various elements depicted in the flowchart may be deleted, or the illustrated sequence of operations may be performed in a different order, or even concurrently. In addition, other embodiments may include additional steps not depicted as part of the flowchart. Moreover, the language used in this disclosure has been principally selected for readability and instructional purposes and may not have been selected to delineate or circumscribe the inventive subject matter, it being necessary to resort to the claims in order to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not necessarily be understood as all referring to the same embodiment.

It will be appreciated that, in the development of any actual implementation (as in any software and/or hardware development project), numerous decisions must be made to achieve a developer's specific goals (e.g., compliance with system- and business-related constraints) and that these goals may vary from one implementation to another. It will also be appreciated that such development efforts might be complex and time consuming but would nevertheless be a routine undertaking for those of ordinary skill in the design and implementation of multi-modal processing systems having the benefit of this disclosure.

Various examples of electronic systems and techniques for using such systems in relation to various technologies are described.

A physical environment, as used herein, refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust the characteristic(s) of graphical content in the XR environment in response to representations of physical motions (e.g., vocal commands).

There are many different types of electronic systems that enable a person to sense and/or interact with various XR environments. Examples include: head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

For purposes of this disclosure, the term "avatar" refers to the virtual representation of a real-world subject, such as a person. The real-world subject may have a static shape or may have a shape that changes in response to movement or stimuli.

FIG. 1 shows a diagram for rendering an avatar with blur and light wrapping effects, according to one or more embodiments. According to some embodiments, a multipass rendering technique is used to generate a composite image of an avatar having an applied visual treatment. In some embodiments, a multipass rendering technique is used to generate stereoscopic frames comprising the avatar representation of a user or other subject. In FIG. 1, a first set of stereoscopic frames includes first left frame 105L and first right frame 105R. In this example, a variation of a representation of an avatar is present in a blur plane 125. According to one or more embodiments, the blur plane may be a region of the frame 105L in which the blur plane 125 is present. Although the details of the right frame 105R are not numerated, in some embodiments, similar components are present in the right frame 105R as described with respect to the left frame 105L.

The blur plane 125 may include a low-resolution version of an avatar representation. Further, the variation of the avatar representation may have one or more visual treatments applied to it. For example, the blur plane 125 may have a blurred treatment applied. In some embodiments, a gaussian blur may be used. The blur may be applied in a number of ways. For example, a sigma radius of the blur may be based on characteristics of the avatar and/or the blur plane, such as a depth of the blur plane. Further, the blur plane 125 may have a light wrapping effect applied to it. The light wrapping effect may be an iridescent effect applied across the avatar representation. The light wrapping treatment may be rendered at the same time the low-resolution version of the avatar is rendered. As such, the blur plane may include the low-resolution version of the avatar with the light wrapping treatment.

A second set of stereoscopic frames includes a second left frame 110L and second right frame 110R. In this example, the second left frame 110L may include a texture 130 that includes the representation of the avatar at the target resolution for presentation. In some embodiments, the avatar representation is part of a second texture. The second right frame 110R may include similar components.

Finally, a third set of stereoscopic frames shows a third left frame 115L from a composite pass. In this frame, the blur texture from frame 105L and the full resolution texture from frame 110L are composited together in accordance with composite parameters. Similarly, the third set of stereoscopic frames show a third right frame 115R from a composite pass. In this frame, the blur texture from frame 105R and the full resolution texture from frame 110R are composited together in accordance with composite parameters. These composite parameters may indicate an assigned opacity level to the full resolution texture. In some embodiments, the assigned opacity may be associated with regions of the avatar having confidence values satisfying a threshold. For example, a confidence value below a predetermined threshold confidence value may be assigned a reduced opacity. Further, some portions of the representation may be predefined as being assigned reduced opacity, such as a hairline of the user, shoulders of the user, or the like.

According to some embodiments, low confidence values may be provided by a pipeline configured to generate the avatar data used to render the avatar. For example, when the avatar is generated, an avatar pipeline may determine confidence values for sensor data for different portions of the avatar indicative of a likelihood that sufficient sensor data and/or other data for the avatar is available to render an honest representation of the corresponding user at that region. In some embodiments, the confidence value may additionally, or alternatively, indicate areas of the avatar which are predetermined to be of low confidence, such as those that are not well represented by an avatar. This may occur, for example, in regions of the avatar associated with large amounts of stretch or the like. As another example, regions of the avatar that may be not well-captured, such as hairlines, sides of the user, torso regions, portions of the user under the chin, or the like may be considered to be of low confidence, such as hairline 140. By contrast, the face 135 may be associated with a high confidence value. Thus, the confidence values may be provided by avatar generation modules, predefined, or otherwise determined for rendering.

Figure 2:
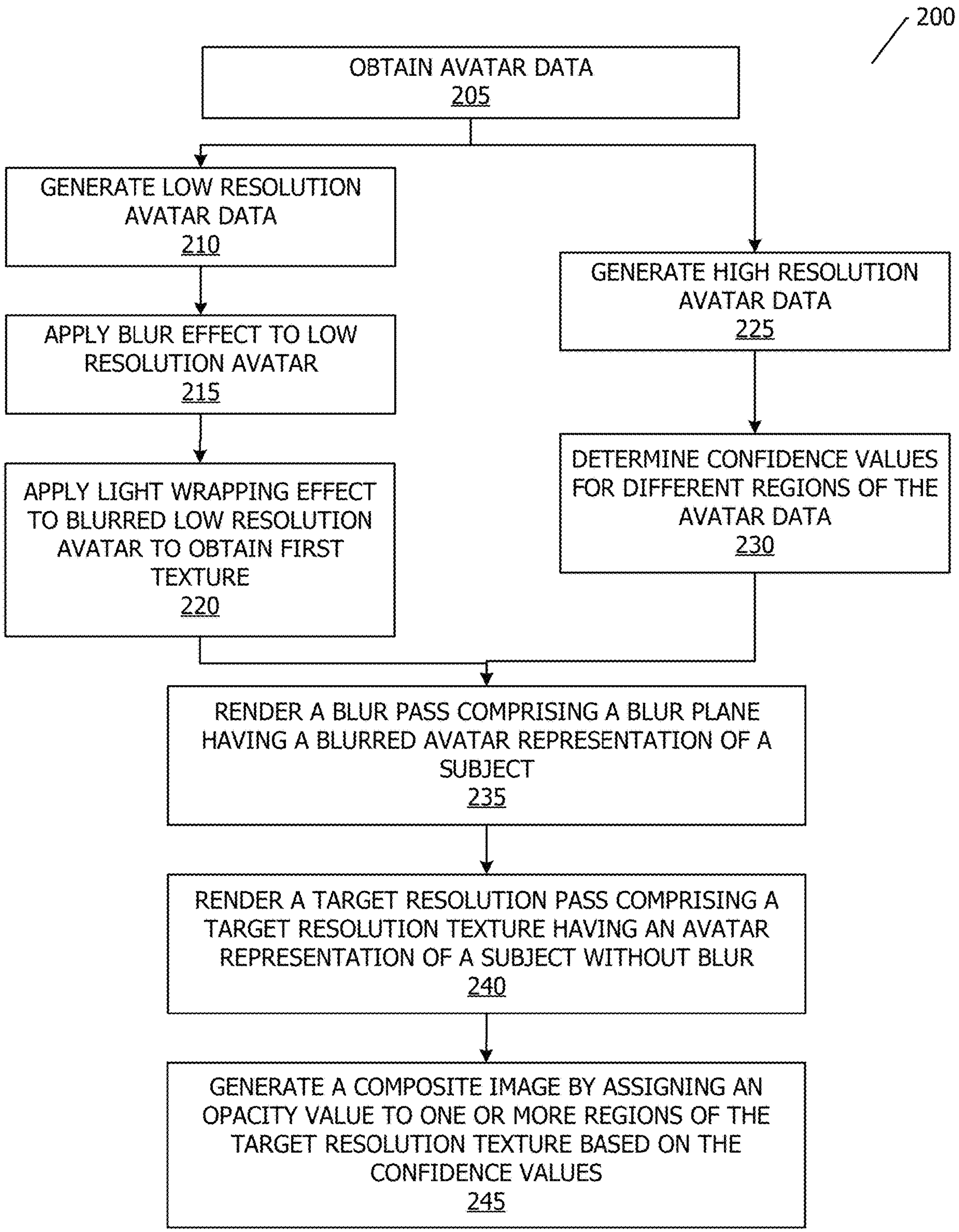
FIG. 2 shows a flowchart of a technique for applying a blur treatment to an avatar, according to one or more embodiments.

FIG. 2 shows a flowchart of a technique for applying a blur treatment to an avatar, according to one or more embodiments. For purposes of explanation, the following steps will be described in the context of FIG. 1. However, it should be understood that the various actions may be taken by alternate components. In addition, the various actions may be performed in a different order. Further, some actions may be performed simultaneously, and some may not be required, or others may be added, according to various embodiments.

The flowchart 200 begins at block 205, where avatar data is obtained. The avatar data may include image data that is obtained, for example, from one or more cameras or other sensors capturing a view and/or movements or characteristics of a user. For example, a user may wear a head mounted device which includes one or more user facing cameras and/or other sensors from which sensor data is captured of the user. The device may use the sensor data to generate avatar data for the user in order to represent the features, characteristics, and/or movement of the user in an animated avatar. In some embodiments, the avatar data may include predefined data for the user, such as enrollment data which may include image data, geometric data, or the like for representing the user in avatar form and which was captured of the user during an enrollment stage.

At block 210, a low-resolution version of the avatar is generated, onto which visual treatments are to be applied. The low-resolution version of the avatar may be rendered at a resolution lower than the target avatar resolution for presentation. In addition, in some embodiments, the low-resolution version generated at block 210 may include a simplified or reduced geometry, reduced color, or the like. As such, the low-resolution avatar data can be rendered quickly compared to a full resolution version of the avatar. According to some embodiments, the low resolution of the avatar may be created for a blur plane having a bounding box around the avatar. The low-resolution version of the avatar may be generated in the form of left and right frames for stereoscopic presentation.

In some embodiments, additional visual effects are applied to the avatar data. At block 215, a blur effect is applied to the low-resolution avatar. According to some embodiments, the blur effect is applied to the entire blur plane for the avatar. In some embodiments, the blur is applied as a gaussian blur. A predetermined level of blur may be used. Alternatively, the level of blur may be selected based on system or avatar characteristics. For example, a blur radius may be selected based on avatar depth, scene characteristics, or the like. A global blur may be used for all avatars in a scene, or different levels of blur may be used for different avatars, as will be described below.

The flowchart 200 proceeds to block 220, where a light wrapping effect is applied to the blurred low-resolution avatar to obtain a first texture. The light wrapping treatment may apply an iridescence effect across the avatar. The application of the light wrapping effect may be based on heuristics of the avatar data, or may be applied to avatars in a global manner. In some embodiments, the intensity of the light wrapping may be adjusted based on the heuristics. As an example, the light wrapping pattern may move in time. A skin segmentation mask and geometry information may be used so the light wrapping treatment is more visible on the edges of the avatar, creating a characteristic silhouette effect. The color may also be adjusted dynamically, for example based on a pass-through video signal luminosity.

Returning to block 205, the flowchart also proceeds to block 225, and a high-resolution avatar is also generated. This avatar may be rendered at a target presentation resolution, for example. Further, the high-resolution avatar may be rendered using additional treatments and features than the low resolution avatar data of block 210. For example, additional or more detailed geometry may be used, as well as other rendering techniques for a target representation of the avatar.

At block 230, confidence values are determined for different regions of the avatar data. In some embodiments, the confidence values may be provided by an avatar pipeline or other module generating avatar data based on sensor data captured or otherwise available for the subject. In particular, the confidence values may indicate a likelihood that a particular region of the avatar can be accurately represented based on the sensor data available. In some embodiments, certain regions of the avatar may be predefined as being regions in which opacity of the target resolution texture should be reduced. For example, certain portions of the subject may be difficult to capture, such as the sides of a user, under a user's chin, hairline, shoulders, or the like.

The flowchart 200 continues to block 235, where the blur plane is rendered in a blur pass. The blur plane, as described at block 220, includes the low-resolution version of the avatar having the blur effect and light wrapping effect applied to it. In some embodiments, the entire blur plane may be rendered. Alternatively, in some embodiments, only portions of the blur planes having the avatar data are rendered. For example, only portions of the blur plane considered to be a region of interest (for example, having the avatar data) may be rendered, thereby omitting the remainder of the blur plane. Further, in some embodiments, a subset of the blur plane may be rendered based on a determination that associated high-resolution version is available, or only available with a confidence value that fails to satisfy predetermined threshold.

The flowchart 200 proceeds to block 240, where a texture pass is rendered comprising a target resolution texture having the avatar representation of the subject without the blur. That is, the target resolution version of the avatar may be rendered as described above with respect to block 225. The texture pass comprising the second texture may be rendered over the blur pass having the blur plane.

The flowchart 200 concludes at block 245, where a composite image is generated by assigning opacity value to one or more regions of the second texture based on the confidence values. Accordingly, portions of the second texture having the target resolution avatar will be assigned a level of transparency that allows the associated low-resolution version of the avatar to shine through, which has the blur and light wrapping effect applied. Accordingly, the composite image includes target resolution portions of the avatar associate with high confidence values, while showing the light wrapped, blurred version of the avatar for regions associated with a confidence value that fails to satisfy predetermined confidence threshold.

Although the steps in FIG. 2 a described in a particular order, it should be understood that in some embodiments, the steps may be performed in an alternative order. further, a low resolution avatar data described at block 210 and the high-resolution avatar data described at block 225 can be performed in either order, or in combination. Further, in some embodiments, the first pass rendered at block 235 may include the high-resolution avatar data, whereas the second pass rendered at block 240 may consist of the low-resolution blurred avatar data. In this embodiment, generating a composite image at block 245 may include sampling from among the first texture and the second texture based on the confidence data.

According to some embodiments, the avatar data described in FIG. 2 may be associated with a single avatar in a frame. However, it should be understood that in some embodiments, multiple avatars may be present. That is, a single frame may include representations of multiple users. In some embodiments, the individual avatars may be associated with different blur panels within a single texture. Alternatively, the blur planes may be rendered in separate textures.

Figure 3A:
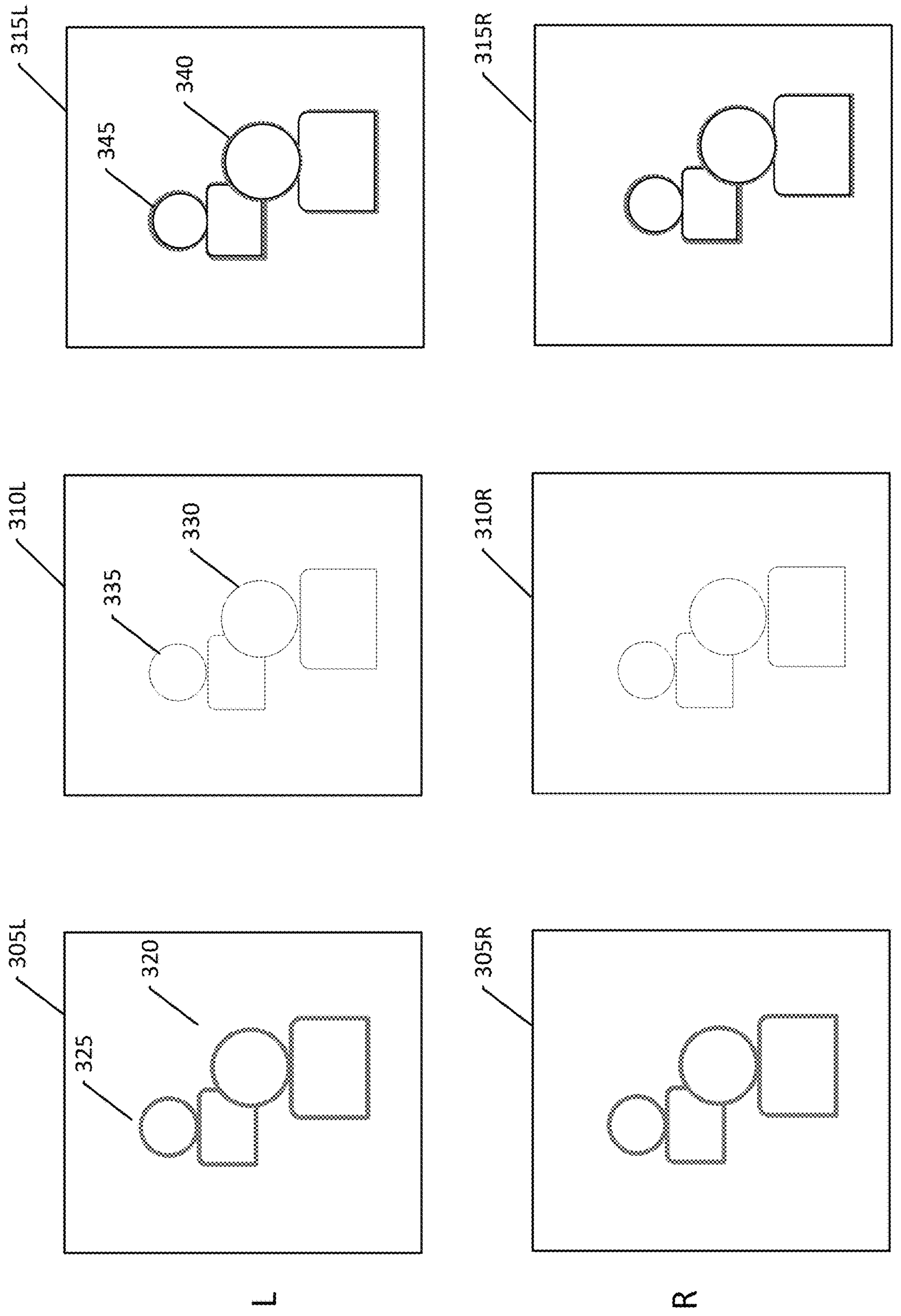
FIGS. 3A-3B shows, in flow diagram form, an example rendering flow for multiple avatars, in accordance with one or more embodiments.
Figure 3B:
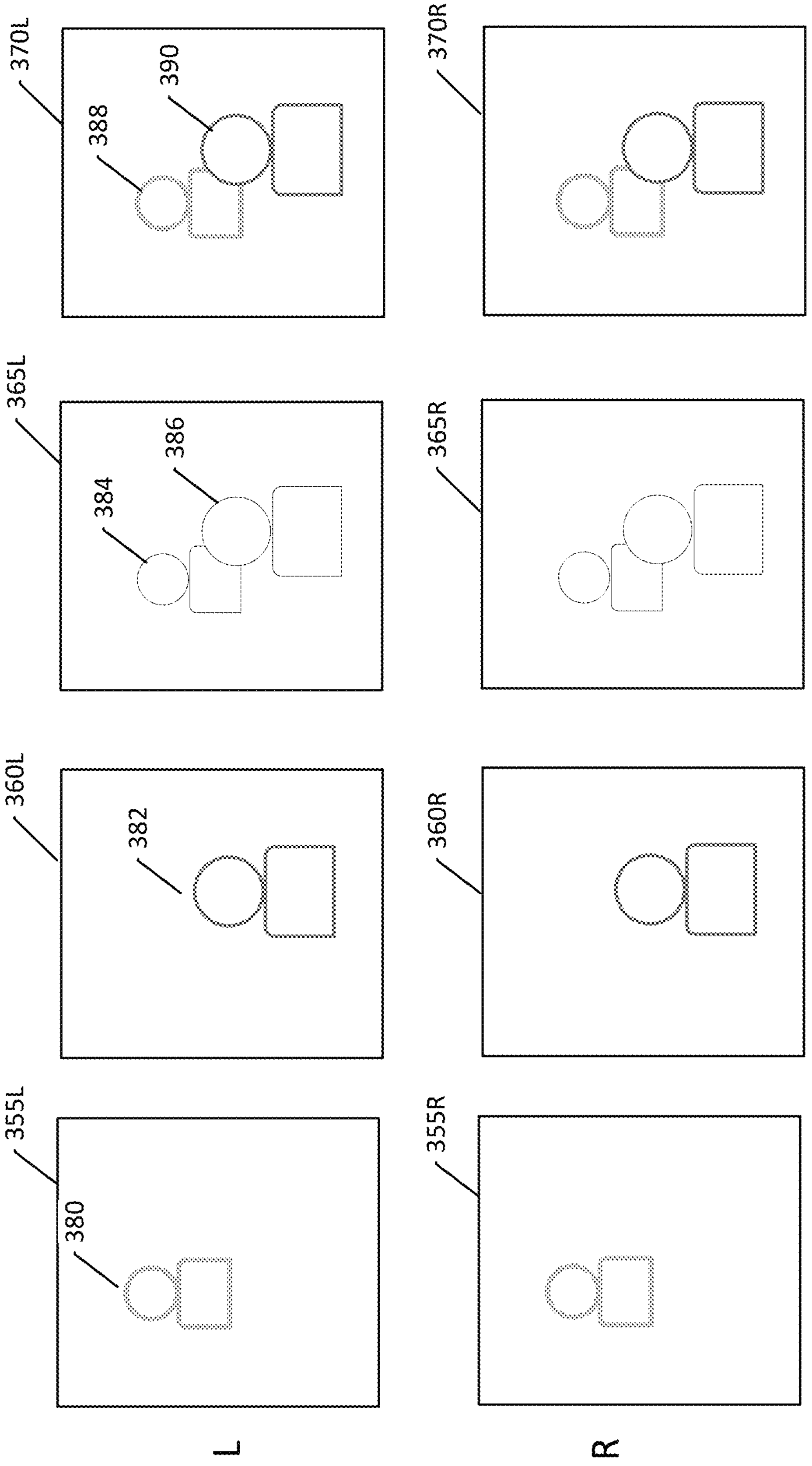

FIGS. 3A-3B shows, in flow diagram form, an example rendering flow for multiple avatars, in accordance with one or more embodiments. FIG. 3A depicts a rendering flow for a texture having multiple blur planes associated with different avatars. By contrast, FIG. 3B depicts a rendering flow where each avatar is depicted in a different texture.

Turning to FIG. 3A, a flow diagram of a multipass rendering technique is presented in which a composite image having multiple avatars is rendered. A first set of stereoscopic frames includes first left frame 305L and first right frame 305R. In this example, a variation of a representation of a first avatar 320 is present in a first blur plane, and a variation of a second representation of a second avatar 325 is presented in a second blur plane. According to one or more embodiments, the blur planes may be a regions of the frame 305 in which each avatar representation is present. Although the details of the right frame 305R are not numerated, in some embodiments, similar components are present in the right frame 305R as described with respect to the left frame 305L.

The blur plane for the first avatar 320 and the blur plane for the second avatar 325 each include a low-resolution version of an avatar representation. Further, the blur planes may have one or more visual treatments applied, such as a blur treatment and/or a light wrapping treatment. In some embodiments, when the blur planes are rendered in a single blur texture, global visual treatments may be applied throughout. That is, the visual treatments applied to the blur plane for the first avatar 320 may be consistent with the visual treatments applied to the blur plane for the second avatar 325.

According to some embodiments, difficulties may arise when rendering multiple blur planes in a single texture. For example, in frame 305L, the blur planes may be associated with different identities such that the data for the first avatar representation 320 may be distinguished from the data for the second avatar representation 325 such that when the final frame is composed, the correct data can be sampled from the texture. In some embodiments, each blur plane may be associated with an identifier based on the avatar within the blur plane. An extra pass may be rendered with a render target texture that stores the unique identity of each blur plane. The pass may be rendered in front to back order. The blur plane target texture can then be sampled when the blur plane material is rendered to ensure the correct corresponding blur plane is used.

A second set of stereoscopic frames includes a second left frame 310L and second right frame 310R. In this example, the second left frame 310L may be generated by a texture pass and may include a target resolution texture that includes the representation of the first avatar 330 and a representation of the second avatar 335 at the target resolution for presentation. In some embodiments, the avatar representation is part of a target resolution texture. The second right frame 110R may include similar components. In some embodiments, the target resolution texture can include a higher resolution version of the avatar representations. Further, in some embodiments, the target resolution texture may include additional data or visual treatments than applied to the low-resolution avatar data of frame 305.

Finally, a third set of stereoscopic frames shows a third left frame 315L from a composite pass. In this frame, the blur texture from frame 305L and the target resolution texture from frame 310L are composited together in accordance with composite parameters. Similarly, the third set of stereoscopic frames show a third right frame 315R from a composite pass. In this frame, the blur texture from frame 305R and the full resolution texture from frame 310R are composited together in accordance with composite parameters. These composite parameters may indicate an assigned opacity level to one or more regions of the target resolution texture. In some embodiments, the assigned opacity may be associated with regions of the avatar having low confidence values. For example, a confidence value below a predetermined threshold confidence value may be considered a low confidence value. Here, the composite image of 315L includes sampled portions of the blur texture from 305L and the target resolution texture from 310L depending upon the assigned opacity to different regions. In some embodiments, the frame 315L is composited such that low confidence regions of the second texture 310L are rendered more transparent than high confidence regions, thereby allowing the low-resolution representation of the avatars from blur plane 320 and blur plane 325 to shine through.

Turning to FIG. 3B, a flow diagram of a multipass rendering technique is presented in which a composite image having multiple avatars is rendered. A first set of stereoscopic frames includes first left frame 355L and first right frame 355R. In this example, a variation of a representation of a first avatar 380 is present in a first blur plane. According to one or more embodiments, the blur plane may be a region of the frame 355L in which each avatar representation is present. Although the details of the right frame 355R are not numerated, in some embodiments, similar components are present in the right frame 305R as described with respect to the left frame 355L.

The blur plane 380 may include a low-resolution version of an avatar representation. Further, the variation of the avatar representation may have one or more visual treatments applied to it. For example, the blur plane 380 may have a blurred treatment applied. In some embodiments, a gaussian blur may be used. The blur may be applied in a number of ways. For example, a sigma radius of the blur may be based on characteristics of the avatar and/or the blur plane, such as a depth of the blur plane and/or associated avatar data. Further, the blur plane 380 may have a light wrapping effect applied to it. The light wrapping effect may be an iridescent effect applied across the avatar representation. The blur plane 380 may be included in a first texture which is rendered in a blur pass.

A second set of stereoscopic frames includes second left frame 360L and second right frame 360R. In this example, a variation of a representation of a second avatar 382 is present in a second blur plane. According to one or more embodiments, the blur plane may be region of the frame 360L in which each avatar representation is present. Although the details of the right frame 360R are not numerated, in some embodiments, similar components are present in the right frame 360R as described with respect to the left frame 355L.

The blur plane for the second avatar 382 includes a low-resolution version of an avatar representation of a second user. Because the blur plane for the first avatar 380 and the blur plane for the second avatar 382 are rendered in separate textures, different visual treatments can be applied, such as the blur treatment and/or the light wrapping treatment described above. Further, the treatments can be applied differently across the first texture in 355 and the second texture in 360. The different treatments can be applied based on characteristics of the avatar, user depicted by the avatar, scene, or the like. For example, a closer avatar may be rendered with a smaller blur radius than an avatar further away. Thus, a single set of visual treatments can be applied to each texture, and different textures can have different visual treatments.

A second set of stereoscopic frames includes a third left frame 365L and second right frame 365R. In this example, the second left frame 365L may include a texture that includes the representation of the first avatar 386 and a representation of the second avatar 384 at the target resolution for presentation. In some embodiments, the target resolution texture can include a higher resolution version of the avatar representations. Further, in some embodiments, the target resolution texture may include additional data or visual treatments than applied to the low-resolution avatar data of the textures in 355 and 360. The third right frame 365R may include similar components as the third left frame 365L.

Finally, a fourth set of stereoscopic frames shows a third left frame 370L from a composite pass. In this frame, the first blur texture from frames 355, the second blur texture from frames 360, and the high resolution texture from frames 365 are composited together in accordance with composite parameters to obtain an avatar representation 388 and avatar representation 390. These composite parameters may indicate an assigned opacity level to one or more regions of the frame. In some embodiments, the assigned opacity may be associated with regions of the avatar having low confidence values. For example, a confidence value below a predetermined threshold confidence value may be considered a low confidence value. Here, the composite image of 370L includes sampled portions of the first blur texture from frames 355L, the second blur texture from frames 360L, and the high resolution texture from frames 365L, depending upon the assigned opacity to different regions. Similarly, the composite image of 370R includes sampled portions of the first blur texture from 355R, the second blur texture from 360R, and the target resolution texture 365R, depending upon the assigned opacity to different regions. In some embodiments, the frames 370 are composited such that low confidence regions of the target resolution texture 365 are rendered more transparent than high confidence regions, thereby allowing the low-resolution representation of the avatars from blur planes 380 and 382 to shine through. According to some embodiments, compositing the textures may include sampling from among the different textures. In some embodiments, the low-resolution textures are associated with different identities such that the compositor can sample from the different textures, for example based on depth, thereby avoiding sampling from both textures for a given region.

Figure 4:
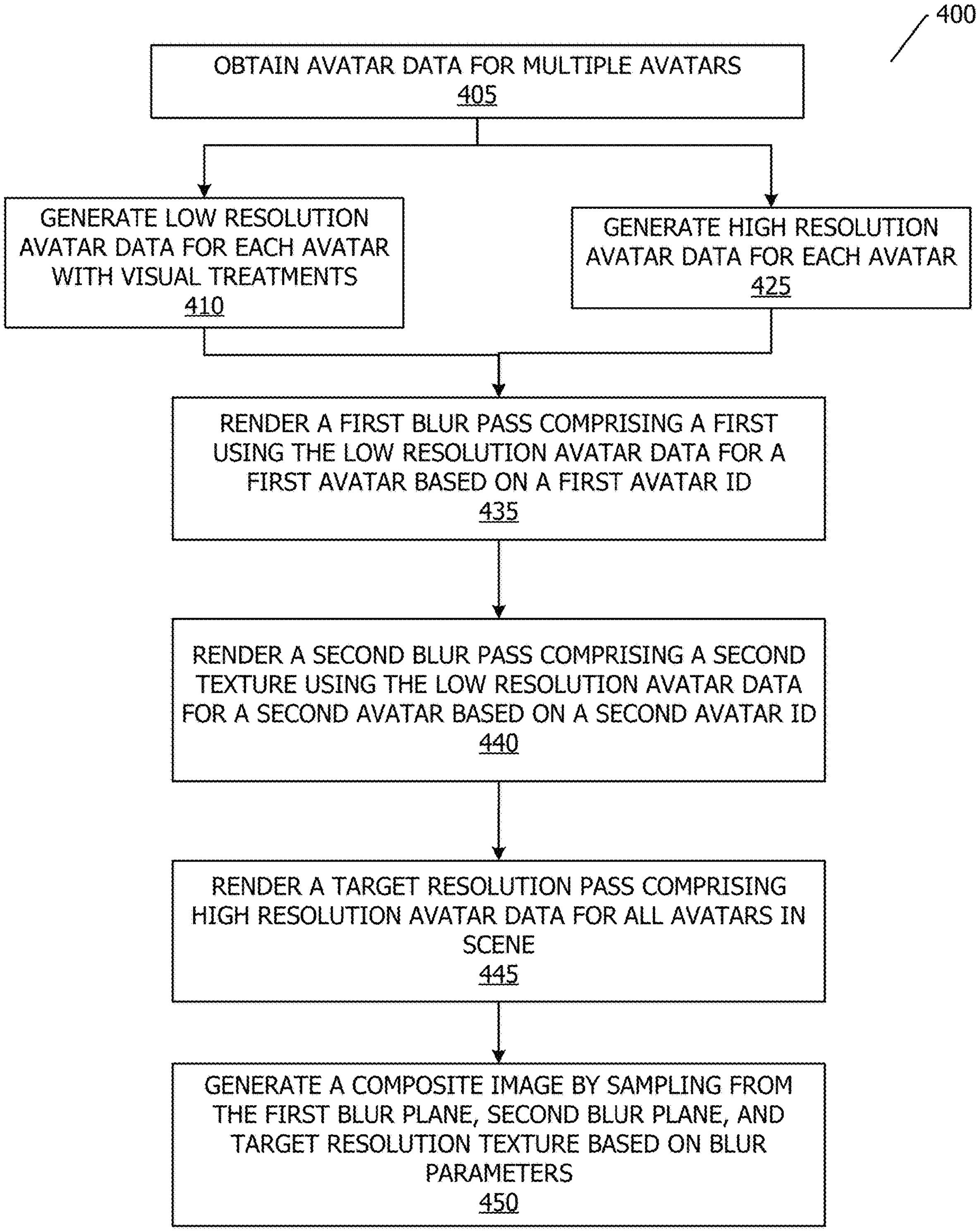
FIG. 4 shows a flowchart directed to techniques for rendering multiple avatars with visual effects, according to one or more embodiments.

FIG. 4 shows a flowchart directed to techniques for rendering multiple avatars with visual effects in a scene, according to one or more embodiments. For purposes of explanation, the following steps will be described with respect to particular components. However, it should be understood that the various actions may be taken by alternate components. In addition, the various actions may be performed in a different order. Further, some actions may be performed simultaneously, and some may not be required, or others may be added, according to various embodiments.

The flowchart 400 begins at block 405, where avatar data is obtained. The avatar data may include image data that may be obtained, for example, from one or more cameras or other sensors capturing a view and/or movements or characteristics of a user. For example, a user may wear a head mounted device which includes one or more user facing cameras and/or other sensors from which sensor data is captured of the user. The device may use the sensor data to generate avatar data for the user in order to represent the features, characteristics, and/or movement of the user in an animated avatar. In some embodiments, the avatar data may include predefined data for the user, such as enrollment data which may include image data, geometric data, or the like for representing the user in avatar form and which was captured of the user during an enrollment stage.

At block 410, a low-resolution version of the avatar is generated, onto which visual treatments are applied. The low-resolution version of the avatar may be rendered at a resolution lower than the target avatar resolution for presentation. In addition, in some embodiments, the low-resolution version generated at block 410 may include a simplified or reduced geometry, reduced color, or the like. According to some embodiments, the low resolution of the avatar may be created for a blur plane having a bounding box around the avatar. The low-resolution version of the avatar may be generated in the form of left and right frames for stereoscopic presentation. In some embodiments, additional visual effects are applied to the avatar data, such as a blur effect and a light wrapping effect.

The flowchart 400 also includes, at block 425, generating a high-resolution avatar. This avatar may be rendered at a target presentation resolution, for example. Further, the high-resolution avatar may be rendered using additional treatments and features than the low-resolution avatar data of block 410. For example, additional or more detailed geometry may be used, as well as other rendering techniques for a target representation of the avatar.

The flowchart 400 proceeds to block 435, where a first blur pass is rendered comprising a blur texture using the low-resolution avatar data based on identity information for the avatars. As described above, in some embodiments, each blur plane may be rendered on a separate texture. In some embodiments, the entire blur texture may be rendered. Alternatively, in some embodiments, only portions of the blur planes having the avatar data or rendered.

The flowchart 400 proceeds to block 440, where a second blur pass is rendered comprising a second texture using the low resolution avatar data for a second avatar based on a second avatar identity. The second texture may then include a blur plane for the second avatar. In some embodiments, the second texture will have different visual effects applied to the avatar data than the first texture. For example, a blur or level of light wrapping may be different.

At block 445, a texture pass is rendered comprising a target resolution texture having the avatar representations of the subjects without the blur. That is, the high-resolution version of the avatar may be rendered. The composite pass may be rendered at a target presentation resolution. Further, the composite pass may include the avatar data for all the avatars in the scene, such as the first avatar and second avatar described above with respect to the first texture and second texture.

The flowchart 400 concludes at block 450, where a composite image is generated by assigning opacity values to one or more regions of the third texture based on the confidence values. Accordingly, portions of the target resolution texture having the high-resolution avatar will be assigned a level of transparency that allows the associated low-resolution version of the avatar to shine through, which has the blur and light wrapping effect applied. Accordingly, the composite image includes high-resolution portions of the avatar associate with high confidence values, while showing the light wrapped, blurred version of the avatars for regions associated with a confidence value that fails to satisfy predetermined confidence threshold value.

In some embodiments, the textures having the blur planes may each be associated with an avatar identifier such that the blur planes can be rendered such that an occluded portion of a blur plane is not rendered. This may occur, for example, by rendering the blur planes based on depth, where the closest blur plane is rendered first, and additional blur planes are only rendered in portions of the frame where no contribution has been made by other blur planes.

The confidence values are determined for different regions of the avatar data. In some embodiments, the confidence values may be provided by an avatar pipeline for other module generating avatar data based on sensor data captured or otherwise available for the subject. In particular, the confidence values may indicate a likelihood that a particular region of the avatar can be accurately represented based on the sensor data available. In some embodiments, certain regions of the avatar may be associated with low confidence values by default. For example, certain portions of the subject may be difficult to capture, such as the sides of a user, under a user's chin, or the like. As another example, portions of the user not well captured by cameras of the device may be associated low confidence values, such as shoulders, hairline, or the like.

Figure 5:
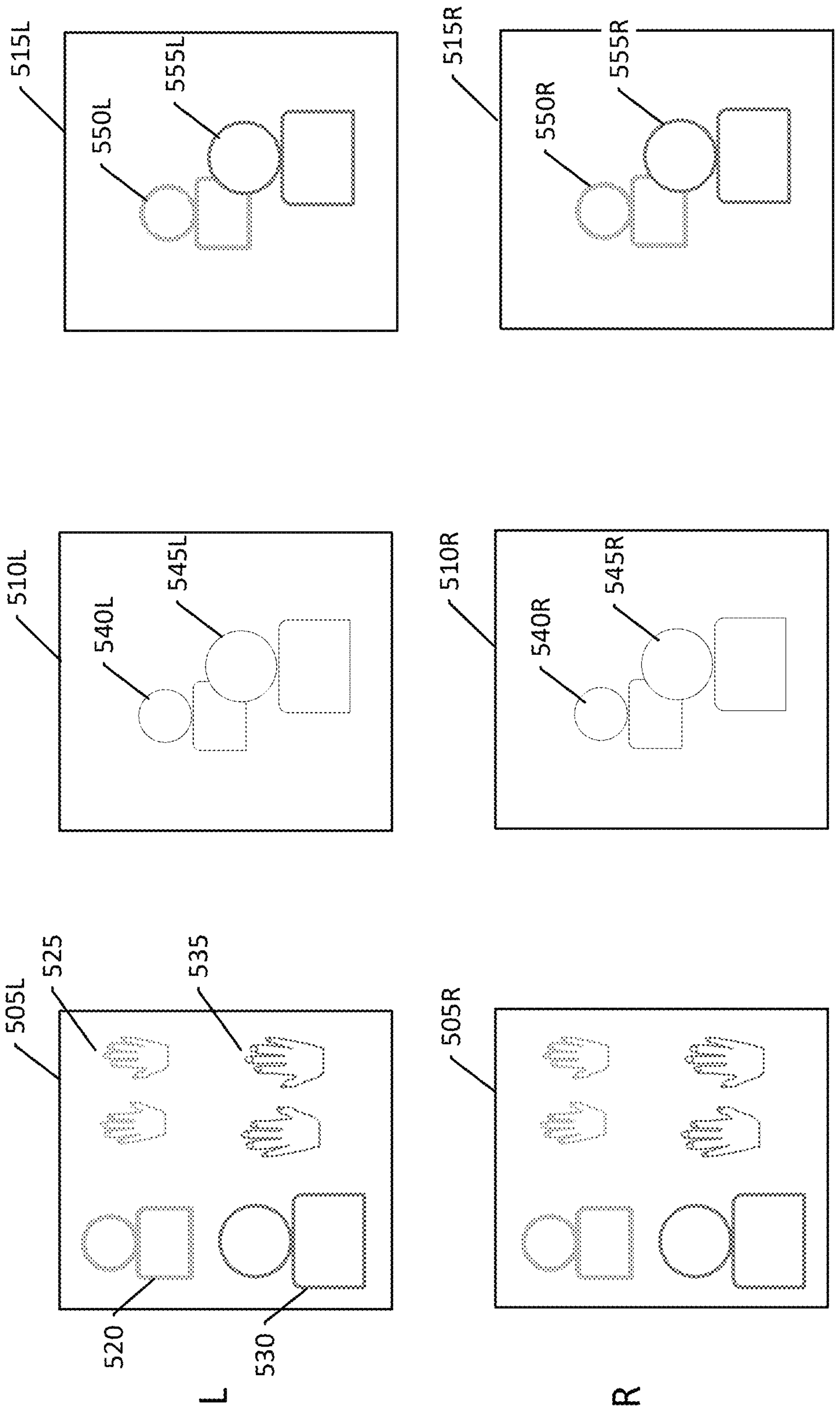
FIG. 5 shows, in flow diagram form, an alternate rendering flow for multiple avatars, in accordance with one or more embodiments.

According to some embodiments, the process for rendering multiple avatars may be further refined by using a single frame to manage multiple avatars in a single frame. Turning to FIG. 5, a flow diagram of a multipass rendering technique is presented in which a composite image having multiple avatars is rendered. A texture atlas is generated to include low resolution avatar data for multiple avatars in a frame. For purposes of this example, the texture atlas includes a first left frame 505L and first right frame 505R for use in a stereoscopic system. However, in some embodiments, a single texture atlas frame may be used.

Each atlas frame includes a rendered version of the blur plane for each avatar. In some embodiments, other portions of the user for which avatar data is available may be rendered in the texture atlas. Accordingly, a first avatar may be associated with a first blur plane 520L for the head and torso of the avatar, and a second blur plane 525L for the hands of the avatar. Similarly, a second avatar may be associated with first blur plane 530L for the head and torso of the avatar, and a second blur plane 535L for the hands of the avatar. Although the details of the right frame 505R are not numerated, in some embodiments, similar components are present in the right frame 505R as described with respect to the left frame 505L.

One advantage of using a texture atlas is that multiple blur planes can be rendered to the frame using different treatments. For example, blur plane 520 and blur plane 525 may have a first blurred treatment applied, as they correspond to a common avatar, or may have different treatments applied. Similarly, blur plane 530 and blur plane 535 may have a same blurred treatment applied, as they correspond to a common avatar, or may have different treatments applied. The various treatments applied to the blur planes may be the same or may differ. Said another way, because the blur plane for the first avatar and the blur plane for the second avatar, or the individual components, are rendered in separate textures in the texture atlas, different visual treatments can be applied, such as the blur treatment and/or the light wrapping treatment described above. Further, the treatments can be applied differently across the different components. The different treatments can be applied based on characteristics of the avatar, user depicted by the avatar, scene, or the like. For example, a closer avatar may be rendered with a larger blur radius than an avatar further away.

A second set of stereoscopic frames includes a second left frame 510L and second right frame 510R. In this example, the second left frame 510L may include a texture that includes the representation of the first avatar 540L and a representation of the second avatar 545L at the target resolution for presentation. In some embodiments, the target resolution texture can include a higher resolution version of the avatar representations. Further, in some embodiments, the target resolution texture may include additional data or visual treatments than applied to the low-resolution avatar data of the textures in the atlas frame 505L and the atlas frame 505R. The second right frame 510R may include similar components as the second left frame 510L, such as a representation of the first avatar 540R at the target resolution, and a representation of the second avatar 545R at the target resolution.

Finally, a third set of stereoscopic frames shows a third left frame 515L from a composite pass. In this frame, the system renders the first avatar 550L by sampling the target resolution rendering of avatar 540L from frame 510L, and the corresponding portions of the atlas frame, such as blur texture 520. Similarly, in third right frame 515R, the system renders the second avatar 550R by sampling the target resolution rendering of avatar 540R from frame 510R, and the corresponding portions of the atlas frame, such as blur texture 530. The sampled portions are composited together in accordance with composite parameters. These composite parameters may indicate an assigned opacity level to one or more regions of the frame. In some embodiments, the assigned opacity may be associated with regions of the avatar having low confidence values. For example, a confidence value below a predetermined threshold confidence value may be considered a low confidence value. Here, the composite image of 515L includes sampled portions of the blur texture from atlas frame 505L such as blur pass 520, and the high-resolution texture from frame 510L, such as high resolution avatar representation 540R, depending upon the assigned opacity to different regions. Similarly, the composite image of 515R includes sampled portions of the blur texture from atlas frame 505R, and the high-resolution texture from frame 510R, such as avatar representation 545R, depending upon the assigned opacity to different regions. In some embodiments, the frames are composited such that low confidence regions of the target resolution are rendered more transparent than high confidence regions, thereby allowing the low-resolution representation of the avatars from blur planes in the texture atlas to shine through.

Figure 6:
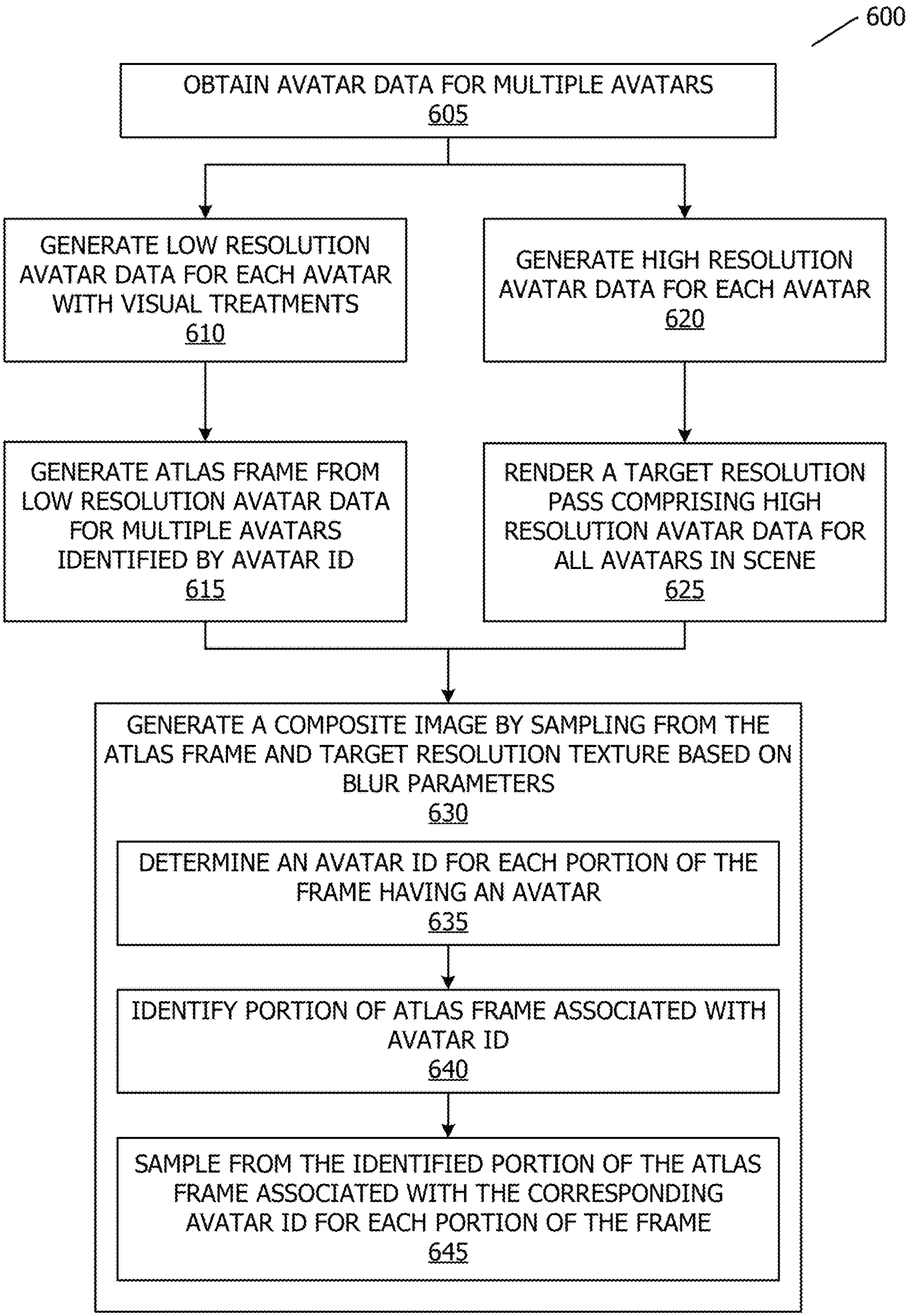
FIG. 6 shows a flowchart directed to alternate techniques for rendering multiple avatars with visual effects, according to one or more embodiments.

FIG. 6 shows a flowchart directed to an alternate technique for rendering multiple avatars with visual effects in a scene, according to one or more embodiments. For purposes of explanation, the following steps will be described with respect to particular components. However, it should be understood that the various actions may be taken by alternate components. In addition, the various actions may be performed in a different order. Further, some actions may be performed simultaneously, and some may not be required, or others may be added, according to various embodiments.

The flowchart 600 begins at block 605, where avatar data is obtained. The avatar data may include image data that may be obtained, for example, from one or more cameras or other sensors capturing a view and/or movements or characteristics of a user. For example, a user may wear a head mounted device which includes one or more user facing cameras and/or other sensors from which sensor data is captured of the user. The device may use the sensor data to generate avatar data for the user in order to represent the features, characteristics, and/or movement of the user in an animated avatar. In some embodiments, the avatar data may include predefined data for the user, such as enrollment data which may include image data, geometric data, or the like for representing the user in avatar form and which was captured of the user during an enrollment stage.

At block 610, a low-resolution version of each avatar is generated, onto which visual treatments are applied. In some embodiments, the low-resolution version generated at block 610 may include a simplified or reduced geometry, reduced color, or the like. According to some embodiments, the low resolution of the avatar may be created for a blur plane having a bounding box around the avatar. The low-resolution version of the avatar may be generated in the form of left and right frames for stereoscopic presentation. In some embodiments, additional visual effects are applied to the avatar data, such as a blur effect and a light wrapping effect. Then, at block 615, the flowchart 600 includes generating an atlas frame fro mteh low resolution avatar data for multiple avatars. In some embodiments, the portion of the atlas frame may be associated with an identifier for which a corresponding avatar can be identified. The low-resolution version of each avatar may be rendered at a resolution lower than the target avatar resolution for presentation. Further, the avatar may include a head, torso, hands, or the like, and may be rendered separately or together.

The flowchart 600 also includes, at block 620, generating a target resolution avatar for each avatar in the scene. This avatar may be rendered at a target presentation resolution, for example. Further, the high-resolution avatar may be rendered using additional treatments and features than the low-resolution avatar data of block 610. For example, additional or more detailed geometry may be used, as well as other rendering techniques for a target representation of the avatars. At 625, a target resolution pass is rendered for all avatars in the scene to obtain a target resolution pass.

The flowchart 600 proceeds to block 630, where a composite image is generated by assigning opacity values to one or more regions of the third texture based on the confidence values. Accordingly, portions of the target resolution texture having the high-resolution avatar will be assigned a level of transparency that allows the associated low-resolution version of the avatar to shine through, which has the blur and light wrapping effect applied. Accordingly, the composite image includes high-resolution portions of the avatar associate with high confidence values, while showing the light wrapped, blurred version of the avatars for regions associated with a confidence value that fails to satisfy predetermined confidence threshold value.

In order to determine which portion of the texture atlas to sample from, at bock 635, the flowchart 600 includes determining an avatar identifier for each portion of the frame having an avatar. For example, each avatar rendered in the high-resolution pass may be associated with a particular identifier. The flowchart 600 also includes, at block 640, identifying portions of the atlas frame associated with the determined avatar identifiers. For example, a determination may be made for a particular portion of the frame which avatar is being rendered. The flowchart 600 concludes block 645, where the system samples from the identified portions of the atlas frame associated with the corresponding avatar identifier for each portion of the frame. This may help, for example, when two avatars are overlapping in the frame. The avatar in front can be used to map the texture atlas to utilize the correct texture for the avatar.

Figure 7:
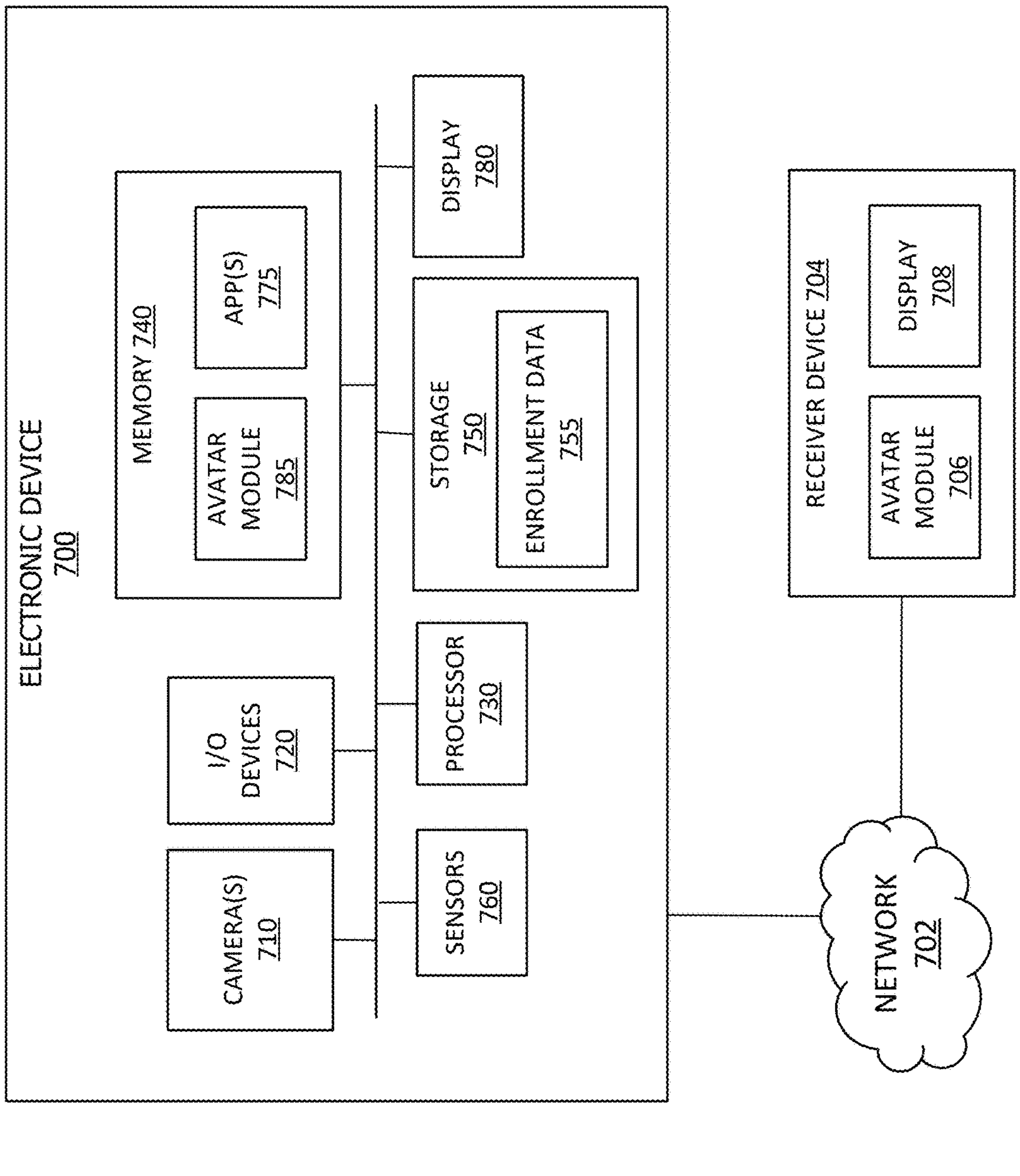
FIG. 7 shows, in block diagram form, an example network diagram, according to one or more embodiments.

FIG. 7 depicts a network diagram for a system by which various embodiments of the disclosure may be practiced. Specifically, FIG. 7 depicts an electronic device 700 that is a computer system having XR capabilities. Electronic device 700 may be part of a multifunctional device, such as a mobile phone, tablet computer, personal digital assistant, portable music/video player, wearable device, head-mounted system, projection-based system, base station, laptop computer, desktop computer, network device, or any other electronic system such as those described herein. Electronic device 700 may be connected to other devices across a network such as accessory electronic devices, mobile devices, tablet devices, desktop devices, or remote sensing devices.

Electronic device 700 may include a processor 730. Processor 730 may be a system-on-chip, such as those found in mobile devices, and include one or more central processing units (CPUs), dedicated graphics processing units (GPUs), or both. Further, processor 730 may include multiple processors of the same or different type. Electronic device 700 may also include a memory 740. Memory 740 may include one or more different types of memory which may be used for performing device functions in conjunction with processor 730. For example, memory 740 may include cache, ROM, RAM, or any kind of transitory or non-transitory computer-readable storage medium capable of storing computer readable code. Memory 740 may store various programming modules during execution, such as XR module 785. XR Module 785 may be configured to provide enhance reality services. For example, the XR module 785 may provide functionality to allow a user to interact with virtual objects in the view of a physical environment.

Memory 740 also includes additional applications 775. These applications may be used within an XR environment and may provide virtual objects viewable in an XR environment. In some embodiments, the additional applications 775 may be associated with user interface (UI) components. These UI components may allow the user to interact with the applications in the XR environment, for example using I/O devices 720. In some embodiments, the UI components may be presented in the form of virtual objects in the scene, such as a UI platter or other virtual component which can be displayed within an XR environment among other objects, including other virtual objects and/or physical objects.

Electronic device 700 may also include storage 750. Storage 750 may include one or more non-transitory computer-readable mediums including, for example, magnetic disks (fixed, floppy, and removable) and tape, optical media such as CD-ROMs and digital video disks (DVDs), and semiconductor memory devices such as Electrically Programmable Read-Only Memory (EPROM) and Electrically Erasable Programmable Read-Only Memory (EEPROM). Storage 750 may be utilized to store various data and structures which may be utilized for presenting virtual objects in an XR environment.

Electronic device 700 may include a set of sensors 760. For example, the set of sensors 760 may include one or more image capture sensors, an ambient light sensor, a motion sensor, an eye tracking sensor, and the like. In other implementations, the set of sensors 760 further includes a depth sensor. Similarly, electronic device 700 may include one or more cameras 710. Cameras 710 may include a single camera, one or more stereocamera systems, multi-camera systems, or the like. In some embodiments, cameras 710 are used to provide a view of a physical environment or physical objects within an environment. Cameras 710 may also be used in a user-facing manner to determine gaze direction and the like.

Electronic device 700 may allow a user to interact with XR environments. Many electronic systems enable an individual to interact with and/or sense various XR settings. One example includes head-mounted systems. A head-mounted system may have an opaque display and speaker(s). Alternatively, a head-mounted system may be designed to receive an external display (e.g., a smartphone). The head-mounted system may have imaging sensor(s) and/or microphones for taking images/video and/or capturing audio of the physical setting, respectively. A head-mounted system also may have a transparent or semi-transparent see-through display 780. The transparent or semi-transparent display may incorporate a substrate through which light representative of images is directed to an individual's eyes. The display may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one embodiment, the transparent or semi-transparent display may transition selectively between an opaque state and a transparent or semi-transparent state. In another example, the electronic system may be a projection-based system. A projection-based system may use retinal projection to project images onto an individual's retina. Alternatively, a projection system also may project virtual objects into a physical setting (e.g., onto a physical surface or as a holograph). Other examples of XR systems include heads-up displays, automotive windshields with the ability to display graphics, windows with the ability to display graphics, lenses with the ability to display graphics, headphones or earphones, speaker arrangements, input mechanisms (e.g., controllers with or without haptic feedback), tablets, smartphones, and desktop or laptop computers.

The various components and functionality of electronic device 700 may additionally or alternatively be distributed across one or more additional devices, such as server devices, base stations, accessory devices, and the like. In addition, the various components and functionality of electronic device 700 may be differently distributed within electronic device 700 according to some embodiments.

Figure 8:
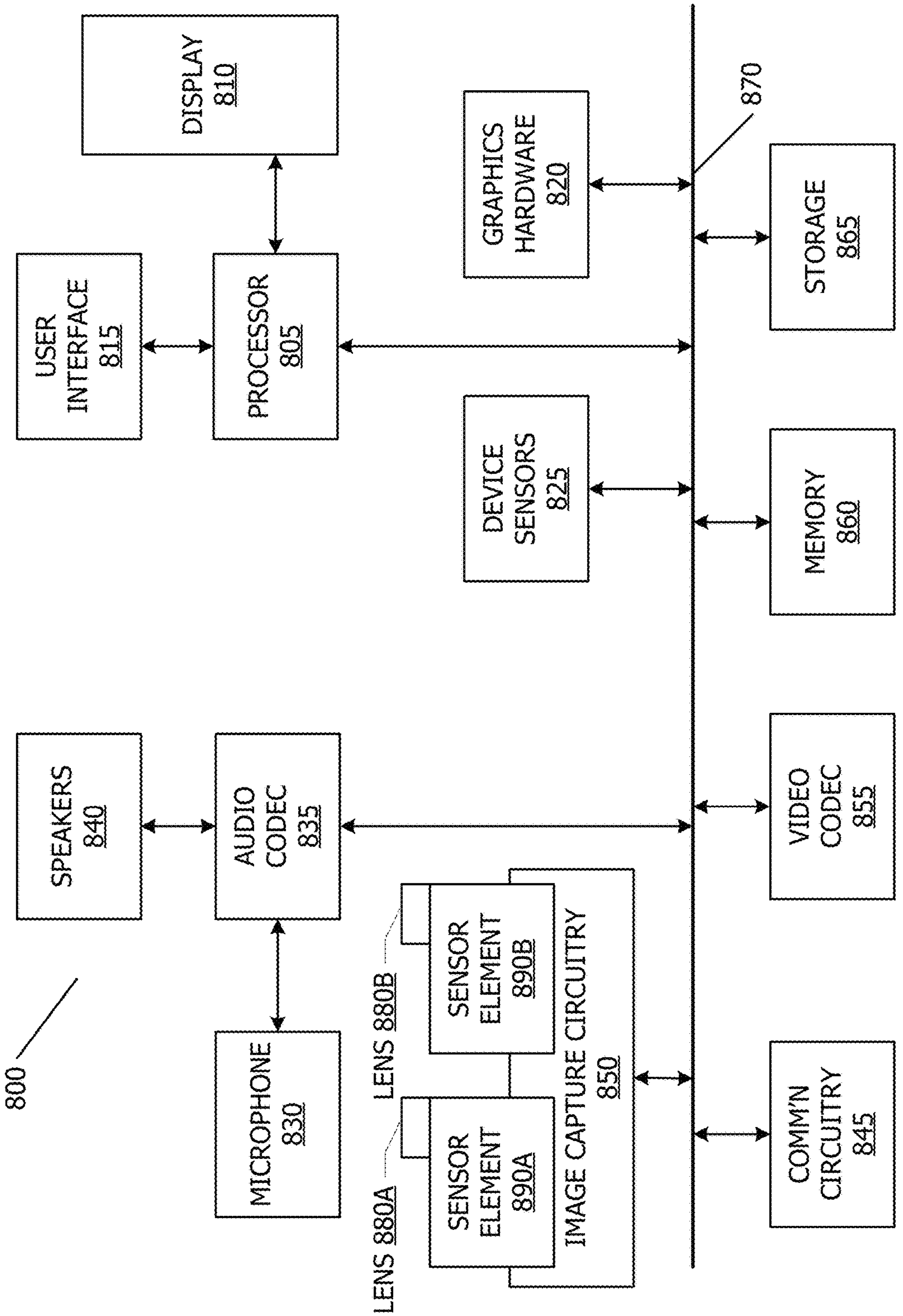
FIG. 8 shows, in block diagram form, a mobile device in accordance with one or more embodiments.

Referring now to FIG. 8, a simplified functional block diagram of illustrative multifunction electronic device 800 is shown according to one embodiment. The electronic device may be a multifunctional electronic device or may have some or all of the components of a multifunctional electronic device described herein. Multifunction electronic device 800 may include some combination of processor 805, display 810, user interface 815, graphics hardware 820, device sensors 825 (e.g., proximity sensor/ambient light sensor, accelerometer and/or gyroscope), microphone 830, audio codec 835, speaker(s) 840, communications circuitry 845, digital image capture circuitry 850 (e.g., including camera system), memory 860, storage device 865, and communications bus 870. Multifunction electronic device 800 may be, for example, a mobile telephone, personal music player, wearable device, tablet computer, or the like.

Processor 805 may execute instructions necessary to carry out or control the operation of many functions performed by device 800. Processor 805 may, for instance, drive display 810 and receive user input from user interface 815. User interface 815 may allow a user to interact with device 800. For example, user interface 815 can take a variety of forms, such as a button, keypad, dial, click wheel, keyboard, display screen, touch screen, and the like. Processor 805 may also, for example, be a system-on-chip, such as those found in mobile devices, and include a dedicated GPU. Processor 805 may be based on reduced instruction-set computer (RISC) or complex instruction-set computer (CISC) architectures or any other suitable architecture and may include one or more processing cores. Graphics hardware 820 may be special purpose computational hardware for processing graphics and/or assisting processor 805 to process graphics information. In one embodiment, graphics hardware 820 may include a programmable GPU.

Image capture circuitry 850 may include one or more lens assemblies, such as lens 880A and 880B. The lens assembly may have a combination of various characteristics, such as differing focal length and the like. For example, lens assembly 880A may have a short focal length relative to the focal length of lens assembly 880B. Each lens assembly may have a separate associated sensor element 890A and 890B. Alternatively, two or more lens assemblies may share a common sensor element. Image capture circuitry 850 may capture still images, video images, enhanced images, and the like. Output from image capture circuitry 850 may be processed, at least in part, by video codec(s) 855, processor 805, graphics hardware 820, and/or a dedicated image processing unit or pipeline incorporated within communications circuitry 845. Images so captured may be stored in memory 860 and/or storage 865.

Memory 860 may include one or more different types of media used by processor 805 and graphics hardware 820 to perform device functions. For example, memory 860 may include memory cache, read-only memory (ROM), and/or random-access memory (RAM). Storage 865 may store media (e.g., audio, image, and video files), computer program instructions or software, preference information, device profile information, and any other suitable data. Storage 865 may include one more non-transitory computer-readable storage mediums, including, for example, magnetic disks (fixed, floppy, and removable) and tape, optical media such as CD-ROMs and DVDs, and semiconductor memory devices such as EPROM and EEPROM. Memory 860 and storage 865 may be used to tangibly retain computer program instructions or computer-readable code organized into one or more modules and written in any desired computer programming language. When executed by, for example, processor 805, such computer program code may implement one or more of the methods described herein.

It is to be understood that the above description is intended to be illustrative and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). Accordingly, the specific arrangement of steps or actions shown in FIGS. 2, 4, and 6 or the arrangement of elements shown in FIGS. 1, 3, 5, and 7-8 should not be construed as limiting the scope of the disclosed subject matter. The scope of the invention, therefore, should be determined with reference to the appended claims, along with the full scope of equivalents to which such claims are entitled. In the appended claims, the terms "including" and "in which" are used as the plain English equivalents of the respective terms "comprising" and "wherein."

The invention claimed is:

1. A non-transitory computer readable medium comprising computer readable code executable by one or more processors to:

generate a composite image, comprising computer readable code to:

render a first texture comprising a first avatar representation of a first subject, wherein the first avatar representation is generated using a blur treatment;

render a second texture comprising a second avatar representation of the first subject, wherein the second avatar representation is associated with one or more confidence values based on sensor data from which the second avatar representation is generated, and wherein the second texture is rendered over the first texture; and modify-a level of opacity of a first region of the second texture in accordance with a first confidence value for the first region.

2. The non-transitory computer readable medium of claim 1, wherein the first texture further comprises a third avatar representation corresponding to a second subject, wherein the third avatar representation is generated using the blur treatment.

3. The non-transitory computer readable medium of claim 2, wherein the first avatar representation is comprised in a first blur plane of the first texture, and wherein the second avatar representation is comprised in a second blur plane of the first texture.

4. The non-transitory computer readable medium of claim 1, further comprising computer readable code to:

render a third texture comprising a third avatar representation of a second subject, wherein the first texture and the third texture are associated with different blur treatments.

5. The non-transitory computer readable medium of claim 4, wherein the first texture and the third texture are rendered in an atlas frame.

6. The non-transitory computer readable medium of claim 1, wherein the one or more confidence values are derived from a geometry pass.

7. The non-transitory computer readable medium of claim 1, further comprising computer readable code to:

identify a region in the second avatar representation satisfying a confidence threshold based on the one or more confidence values, wherein the level of opacity of the second avatar representation is further determined based on the one or more confidence values.

8. The non-transitory computer readable medium of claim 1, wherein the computer readable code to render the first texture comprises computer readable code to:

determine one or more regions of interest; and render a portion of the first texture comprising the regions of interest, while omitting regions of the first texture outside the one or more regions of interest.

9. A system comprising:

one or more processors; and one or more computer readable media comprising computer readable code executable by the one or more processors to:

generate a composite image, comprising computer readable code to:

render a first texture comprising a first avatar representation of a first subject, wherein the first avatar representation is generated using a blur treatment;

render a second texture comprising a second avatar representation of the first subject, wherein the second avatar representation is associated with one or more confidence values based on sensor data from which the second avatar representation is generated, and wherein the second texture is rendered over the first texture; and modify-a level of opacity of a first region of the second texture in accordance with a first confidence value for the first region.

10. The system of claim 9, wherein the first texture further comprises a third avatar representation corresponding to a second subject, wherein the third avatar representation is generated using the blur treatment.

11. The system of claim 9, further comprising computer readable code to:

render a third texture comprising a third avatar representation of a second subject, wherein the first texture and the third texture are associated with different blur treatments.

12. The system of claim 9, wherein the computer readable code to render the first texture comprises computer readable code to:

determine one or more regions of interest; and render a portion of the first texture comprising the regions of interest, while omitting regions of the first texture outside the one or more regions of interest.

13. A method comprising:

generating a composite image by:

rendering a first texture comprising a first avatar representation of a first subject, wherein the first avatar representation is generated using a blur treatment;

rendering a second texture comprising a second avatar representation of the first subject, wherein the second avatar representation is associated with one or more confidence values based on sensor data from which the second avatar representation is generated, and wherein the second texture is rendered over the first texture; and modifying a level of opacity of a first region of the second texture in accordance with a first confidence value for the first region.

14. The method of claim 13, wherein the first texture further comprises a third avatar representation corresponding to a second subject, wherein the third avatar representation is generated using the blur treatment.

15. The method of claim 14, wherein the first avatar representation is comprised in a first blur plane of the first texture, and wherein the second avatar representation is comprised in a second blur plane of the first texture.

16. The method of claim 13, further comprising:

rendering a third texture comprising a third avatar representation of a second subject, wherein the first texture and the third texture are associated with different blur treatments.

17. The method of claim 16, wherein the first texture and the third texture are rendered in an atlas frame.

18. The method of claim 13, wherein the one or more confidence values are derived from a geometry pass.

19. The method of claim 18, further comprising:

identifying a region in the second avatar representation satisfying a confidence threshold based on the one or more confidence values, wherein the level of opacity of the second avatar representation is further determined based on the one or more confidence values.

20. The method of claim 13, wherein rendering the first texture comprises:

determining one or more regions of interest; and rendering a portion of the first texture comprising the regions of interest, while omitting regions of the first texture outside the one or more regions of interest.

* * * * *